No. 884,671. PATENTED APR. 14, 1908.
W. R. LAMB.
BUR COTTON THRESHER, CLEANER, AND STORAGE UNLOADER.
APPLICATION FILED JUNE 5, 1907.
2 SHEETS—SHEET 1.
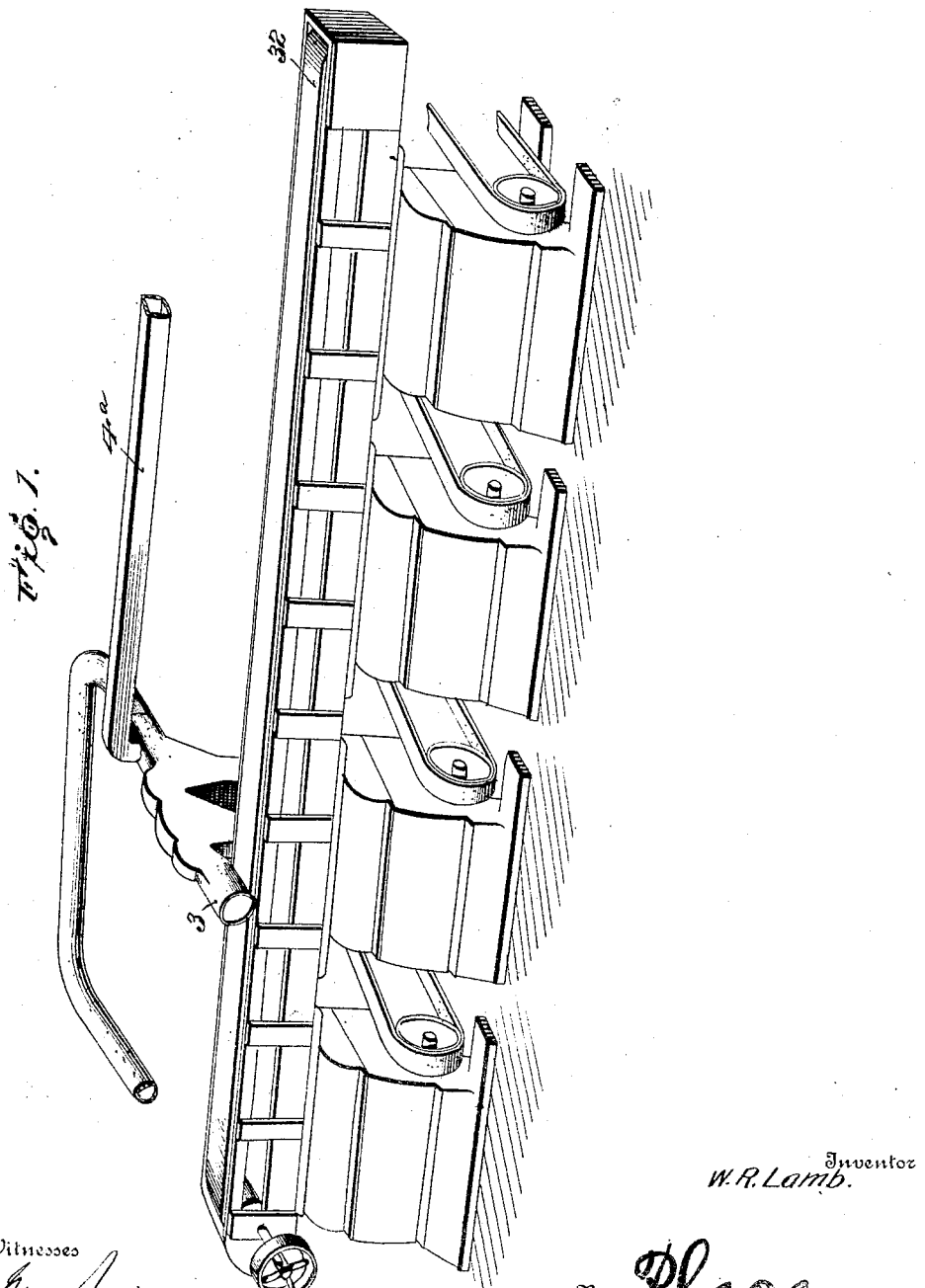
Witnesses
Inventor
W. R. Lamb.
By
Attorneys No. 884,671. PATENTED APR. 14, 1908.
W. R. LAMB.
BUR COTTON THRESHER, CLEANER, AND STORAGE UNLOADER.
APPLICATION FILED JUNE 5, 1907.
2 SHEETS—SHEET 2.
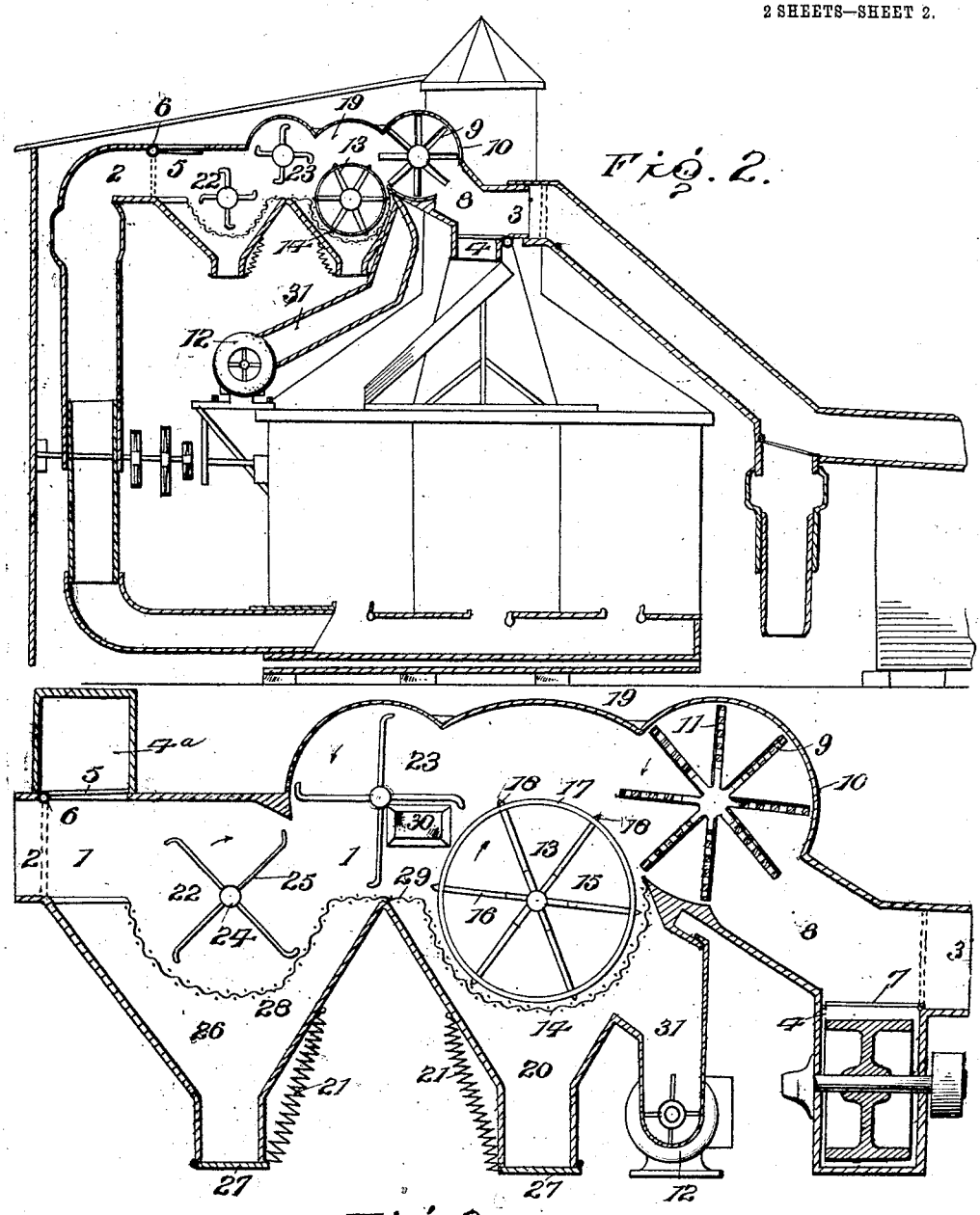
Inventor
W. R. Lamb.
Witnesses
By
Attorneys

UNITED STATES PATENT OFFICE.

WILLIAM R. LAMB, OF BOWIE, TEXAS.

BUR-COTTON THRESHER, CLEANER, AND STORAGE UNLOADER.

No. 884,671.  Specification of Letters Patent.  Patented April 14, 1908.

Application filed June 5, 1907. Serial No. 377,451.

*To all whom it may concern:*

Be it known that I, WILLIAM R. LAMB, citizen of the United States, residing at Bowie, in the county of Montague and State of Texas, have invented certain new and useful Improvements in Bur-Cotton Threshers, Cleaners, and Storage Unloaders, of which the following is a specification.

This invention consists of a machine or mechanism designed for use in connection with elevating and distributing systems of cotton-gins for unloading, threshing, beating, cleaning and separating the dirt, grit, trash or other foreign matter from the bur or seed-cotton as it passes from the wagons or seed-cotton house to the receivers and the feeders of the various cotton-gins, or the cotton storage house when used as an unloader.

The invention is applied to pneumatic elevating and distributing systems, or those which involve the use of the suction conduit or tube for taking the cotton from the wagons or cotton-house and conveying the same to the feeders of the gins, the threshing and cleaning devices utilized in this invention being located in the length of the suction or exhaust blast conduit so as to facilitate the opening of the burs and removal of the foreign matter before the cotton reaches the gins, or cotton storage house, thereby enabling the hullers in the huller gins to remove the burs while the saws take the seed-cotton thus separated from the burs and gin it into marketable lint cotton at the same time decreasing the wear upon the gin-saws and other operating parts of the ginning mechanisms, conducing to long life of the ginning machines and cleaning the cotton thoroughly before the same is ginned, or stored.

This invention can readily be attached to both the air and belt distributing systems of cotton-gins or cotton storage house as will be observed by reference to the accompanying drawings. When applied to the belt distributing system the vacuum box should be removed from the belt distributer box and the exhaust blast fan connected rectly to this machine, as will be hereinaf  fully explained.

For a full understanding of the invention and the merits thereof and also to acquire a knowledge of the details of construction and the means for effecting the result, reference is to be had to the following description and accompanying drawings, in which:

Figure 1 is a perspective view showing the application of the invention to a belt distributer of a battery of cotton-gins. Fig. 2 is a view showing the application of the invention to a storage house and to a cotton-gin house having a pneumatic distributer. Fig. 3 is a longitudinal sectional view of the invention on a larger scale.

Corresponding and like parts are referred to in the following description and indicated in all the views of the drawings by the same reference characters.

The invention comprises a casing or framework forming a housing for inclosing the operating parts. An approximately horizontal passage 1 extends through the upper portion of the casing or framework and has an inlet 2 and outlets 3 and 4. Near the inlet 2 is a pipe 4ª which is in connection with the belt distributer so as to receive the overflow of cotton therefrom. A valve 5 controls communication between the passage 1 and the inlet 2 or the overflow pipe 4ª, said valve being pivoted at 6 and adapted to swing either into a horizontal position, as shown by the full lines in Fig. 3, or into vertical position, as shown by the dotted lines in said figure. A valve 7 controls the outlets 3 and 4 and may be of any construction either pivoted or arranged to slide. The two positions of the valve 7 are indicated by full and dotted lines in Fig. 3. When the valve 7 is in the position shown by full lines in Fig. 3, the outlet 3 is connected to a pneumatic distributer and when said valve is in the position shown by dotted lines in said Fig. 3, the outlet 4 is in communication with a belt distributer, or cotton storage house. When one of the outlets is open at the same time the other is closed. The passage 1 at its discharge end is downwardly inclined, as indicated at 8. A rotary valve 9 is located at the juncture of the horizontally inclined portions of the passage, said valve being arranged to fit closely within a casing 10 which is in communication with the horizontal and inclined portions of the said passage. To insure a close fit between the blades of the rotary valve and its casing, said blades are provided with a cover 11 of rubber or other material, the edge portions of said packing material projecting so as to make close contact with the walls of the casing. The rotary valve is only used when the appliance is employed in connection with a belt distributer, thereby preventing any back draft due to the action of the suction fan 12 in creating a draft through the appliance to properly feed the cotton therethrough. When the appliance is attached to a pneumatic distributer, the same being connected at the outlet 3, the rotary valve 9 is omitted. It will thus be understood that the appliance is adapted for use in connection with different types of feeders or distributers for a battery of cotton-gins, or storage house. The thresher is located intermediate the length of the appliance and comprises a drum 13 and a concave or breast 14. The drum 13 consists of a shaft 15, arms 16, cylinder 17 and teeth 18. The cylinder 17 is of open work and may consist of a reticulated material or wire screen. The shaft 15 is located about in line with the bottom side or lower wall of the passage 1, hence one-half of the drum projects above the plane of the bottom of the passage 1 and the other half is located below said plane. A curved passage 19 is arranged above the threshing mechanism for the travel of the cotton when freed from the hulls. A box 20 is arranged below the threshing mechanism and receives hulls and other foreign matter. A valve 21 closes the lower end of the box 20 and is normally held shut by means of a spring 21. Similarly constructed beaters 22 and 23 are located the one above the other and at different points in the length of the passage and are rotated in reverse directions. Each of these beaters comprises a shaft 24 and arms 25. The extremities of the arms 25 are curved rearward so as to free themselves more readily from the cotton. The shaft of the beater 22 is located about in the plane of the bottom of the passage 1, whereas the shaft of the beater 23 is arranged about in the plane of the top of said passage. The upper arms of the beaters 22 project upward into the passage 1, whereas the arms of the beater 23 extend downward into said passage. While the beaters 22 and 23 are rotated in opposite directions, the arms projected into the passage 1, travel in the same direction and serve to advance the cotton to the pressure. The beater 22 tends to draw the cotton upward, whereas the beater 23 moves the same downward and insures its delivery to the threshing mechanism, which is of the over-shot type. A box 26 is located below the beater 22 and is provided with a spring actuated valve 27 similar to the valve 21.

Open work material is arranged beneath the beaters and may be of wire fabric or reticulated material. The material below the beater 22 is of half-round form, as indicated at 28, whereas the material below the beater 23 is straight, as shown at 29. The beaters 22 and 23 clear the cotton bolls of foreign matter in advance of the action of the threshing mechanism, which works up and removes the hulls. The heavier foreign matter accumulates in the box 26, whereas the hulls and lighter foreign matter are received in the box 20. Windows or observation openings 30 are provided in opposite sides of the casing or framework of the appliance to admit of inspecting the interior of the apparatus when required. The suction fan 12 is connected with the delivery portion of the passage 1 by means of a duct 31. A certain percentage of light foreign matter is carried off through the duct 31 and suction fan. The suction fan is designed for use chiefly to create a suction draft through the appliance when the same is fitted to a belt distributer, with the result that the material is fed through the apparatus. When the appliance is connected with a pneumatic distributer, it is not necessary to run the suction fan 12, as the draft established through the framework by the pneumatic distributer is usually sufficient to feed the cotton through the mechanism. It is possible under some conditions to close the passage 8 in any manner and to use the suction fan 12 for effecting delivery of the cotton after being threshed from the apparatus.

The cotton in the boll may be taken direct either from a wagon or from a storage house, as indicated in Fig. 2, and is passed through the mechanism which removes all foreign matter, breaks up the hulls and liberates the cotton therefrom, said cotton after being threshed being carried to the gins either by a pneumatic distributer or feeder, as indicated in Fig. 2, or by a belt feeder or distributer 32 as indicated in Fig. 1.

Having thus described the invention, what is claimed as new is:

1. In a device of the character set forth, the combination of a casing having an inlet and an outlet at opposite ends and having a passage between said inlet and outlet, a threshing mechanism located near one end of the casing and a beater near the opposite end, and a second beater arranged between the threshing mechanism and the first-mentioned beater, the axis of the first mentioned beater and the threshing mechanism being about in a plane of the bottom of the passage and the axis of the intermediate beater being about in the plane of the top of said passage.

2. In a device of the character specified, the combination of a casing having an inlet and an outlet at opposite ends, cleaning and threshing mechanism intermediate of the ends of the casing, an overflow pipe in connection with the receiving end of said casing, and a valve for controlling the inlet and the communication between said overflow pipe and the receiving portion of the casing.

3. In a device of the character specified, the combination of a casing provided with two outlets, the one adapted to be connected with a pneumatic distributer and the other with a belt distributer, or cotton storage house, cleaning and threshing mechanisms arranged within the casing, and a valve for controlling one or the other of said outlets.

4. In mechanism of the character set forth, the combination of a casing having an inlet at one end and a double outlet at the opposite end, one outlet adapted to be connected with a pneumatic distributer and the other outlet with a belt distributer, feeding and threshing mechanisms arranged in the length of the casing between the inlet and the double outlet thereof, and a suction mechanism having connection with the casing near the double outlet and between the said outlet and the threshing mechanism.

5. The herein described mechanism comprising a casing having an inlet and outlets and having a passage, an overflow pipe in connection with the inlet end of the casing, a valve for controlling the inlet or the opening establishing communication between the overflow pipe and the casing, a valve for controlling the outlets, rotary beaters located at different points in the length of the casing, the one having its axis about in the plane of the bottom of the passage and the other having its axis about in line with the top of said passage, a threshing mechanism having its axis about in line with the bottom of the passage, valve boxes arranged below the threshing mechanism and the first beater, a suction fan having communication with the casing between the threshing mechanism and outlets, and a rotary valve arranged in the length of the casing between the threshing mechanism and the aforesaid outlets.

In testimony whereof I affix my signature in presence of two witnesses.

WILLIAM R. LAMB. [L. S.]

Witnesses:
STERLING P. SMITH,
ELIZABETH M. G. LAMB.